(12) United States Patent
Devambe

(10) Patent No.: US 6,533,259 B2
(45) Date of Patent: Mar. 18, 2003

(54) RESILIENT RETURN MEANS HAVING A FIXING SEAT AND ELONGATE BODY FITTED WITH SUCH RESILIENT RETURN MEANS

(75) Inventor: David Devambe, Villiers sur Marne (FR)

(73) Assignee: Robert Bosch GmbH, Stuttgart (DE)

(*) Notice: Subject to any disclaimer, the term of this patent is extended or adjusted under 35 U.S.C. 154(b) by 51 days.

(21) Appl. No.: 09/763,285
(22) PCT Filed: Dec. 22, 2000
(86) PCT No.: PCT/FR00/03679
§ 371 (c)(1), (2), (4) Date: Feb. 20, 2001
(87) PCT Pub. No.: WO01/48392
PCT Pub. Date: Jul. 5, 2001

(65) Prior Publication Data
US 2003/0034599 A1 Feb. 20, 2003

(30) Foreign Application Priority Data
Dec. 28, 1999 (FR) .............................................. 99 16612

(51) Int. Cl.$^7$ .................................................. F16F 1/06
(52) U.S. Cl. ........................ 267/166; 267/179; 267/180
(58) Field of Search .............................. 267/166, 166.1, 267/167, 174, 180, 179

(56) References Cited

U.S. PATENT DOCUMENTS

| | | | | |
|---|---|---|---|---|
| 3,033,622 A | * | 5/1962 | Renner | 267/180 |
| 3,343,564 A | * | 9/1967 | Peeples et al. | 267/180 |
| 3,511,280 A | * | 5/1970 | Mercier | 267/180 X |
| 4,110,418 A | * | 8/1978 | Martin | 267/180 |
| 4,261,718 A | * | 4/1981 | Garner | 261/DIG. 72 |
| 4,765,365 A | * | 8/1988 | Roland | 267/166.1 |
| 5,909,791 A | * | 6/1999 | DiStefano | 267/180 X |

* cited by examiner

Primary Examiner—Christopher P. Schwartz
Assistant Examiner—Melanie Torres
(74) Attorney, Agent, or Firm—LeoH McCormick, Jr.; Warren Comstock

(57) ABSTRACT

This invention relates to a resilient return having a fixing seat, and to an elongate body fitted with such resilient return. The resilient return, particularly a spring in accordance with the invention, comprise a seat (9) capable of fitting into a receiving cavity, made in at least one wall (10) of an elongate element (29), typically in the radially-inner face of the wall of a tubular element, of a sleeve or similar. The present invention mainly applies to the motor car industry and especially to the design and manufacturing of braking devices.

8 Claims, 4 Drawing Sheets

RESILIENT RETURN MEANS HAVING A FIXING SEAT AND ELONGATE BODY FITTED WITH SUCH RESILIENT RETURN MEANS

The present invention mainly relates to resilient return means having a fixing seat, and to an elongate body fitted with such resilient return means.

BACKGROUND OF THE INVENTION

The manufacturing of elongate tubular bodies fitted with an inner spring exerting an axial return force is well known. The seat of a spring of a known type bears on an inner shoulder of the elongate tubular body or on a retaining ring, received in a groove made in the radially-inner wall of the elongate tubular body.

The implementation of a shoulder means causes a considerable increase in the cost price of the spring-accommodating tubular body, whereas the use of a retaining ring implies a greater number of parts in the assembly, which leads to a more complicated manufacturing process. Besides, the shoulder or the retaining ring alters the hydrodynamic behaviour of the tubular body, which can turn out to be quite troublesome.

SUMMARY OF THE INVENTION

Therefore, it is an object of the present invention to provide resilient return means, more particularly a spring capable of seating on at least one wall of an axial or a substantially axial passage, made in an elongate element, so as to exert an axial or a substantially axial return force in said passage.

It is another object of this invention to provide resilient return means having a simple construction.

Another object of the present invention consists in providing such resilient return means, both reliable and having a long service life.

It is also an object of the present invention to provide an elongate body including an axial or a substantially axial passage fitted with axial or substantially axial resilient return means.

Another object still of the invention consists in providing such an elongate body fitted with said reliable resilient return means, at a moderate cost price while minimizing the hydrodynamic disturbances.

It is another object of the invention to provide a brake master cylinder, more particularly a tandem master cylinder, reliable, with a simple construction and at a moderate cost price.

These objects are achieved by resilient return means, more particularly a spring in accordance with the present invention, comprising a seat capable of fitting into a receiving cavity, made in at least one wall of an elongate element, typically in the radially-inner face of a wall of a tubular element, of a sleeve or similar.

This invention essentially concerns resilient return means, comprising an axial return element and an attachment seat, characterised in that the seat is radially compliant so as to be capable of elastically engaging with a receiving cavity, made in at least one wall of an elongate element.

Another subject matter of the present invention is resilient return means, characterised in that said means comprise a spring.

Another aspect of the present invention lies in resilient return means, characterised in that said spring is a spiral spring.

According to another feature, said resilient return means are characterised in that said spring is subjected to a compressive load.

The present invention also deals with resilient return means, characterised in that they comprise a polygonal seat.

Another subject of this invention is resilient return means, characterised in that the return element bears on the seat at three points of contact.

Another subject matter still of the present invention is an elongate body, comprising a passage fitted with a return spring, characterised in that said spring includes a resilient element and a radially-compliant seat capable of engaging with a receiving cavity, made in the inner wall of the passage provided in the elongate body.

This invention also deals with an elongate body, characterised in that said elongate body is a tubular one.

According to another aspect of the invention, such an elongate body is characterised in that the passage is rectilinear and in that the resilient return means are axially arranged in said passage.

In a further aspect of the present invention, such an elongate body is characterised in that said body is a tandem master cylinder and in that the resilient return means ensure the axial return of a valve.

Other features and advantages of the will emerge cllearly from the description thereof when taken in conjunction with the accompanying drawings.

DETAILED DESCRIPTION OF THE INVENTION

Figure 2:
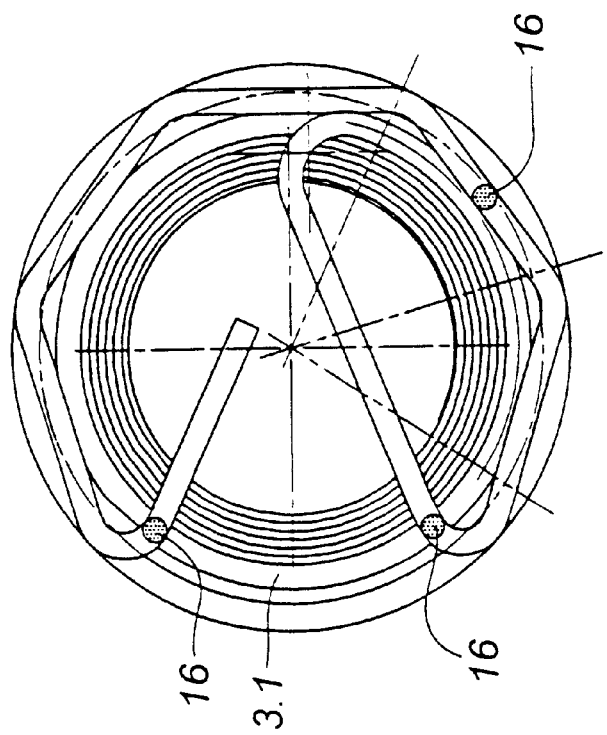
FIG. 2 is a top view of the resilient return means of FIG. 1.

In FIG. 1 through 7, the same reference numerals will designate the same elements.

Figure 1:
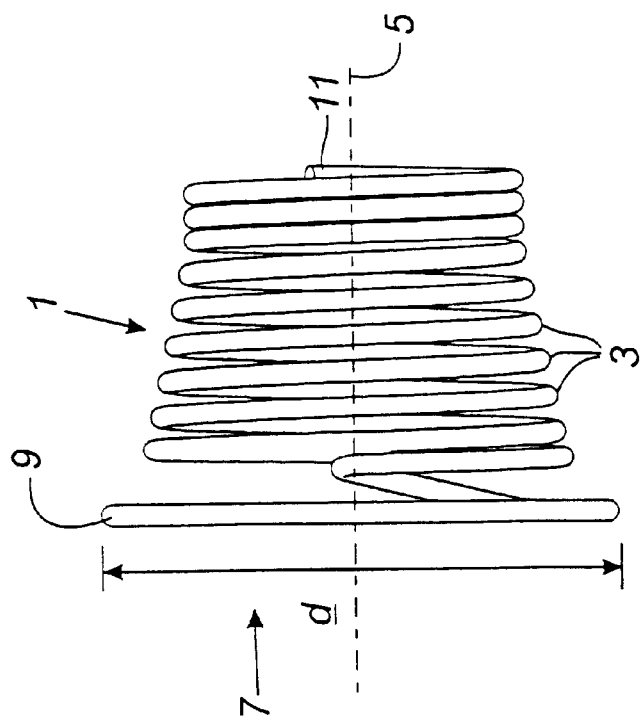
FIG. 1 is a side view of the preferred embodiment of resilient return means according to this invention.
Figure 3:
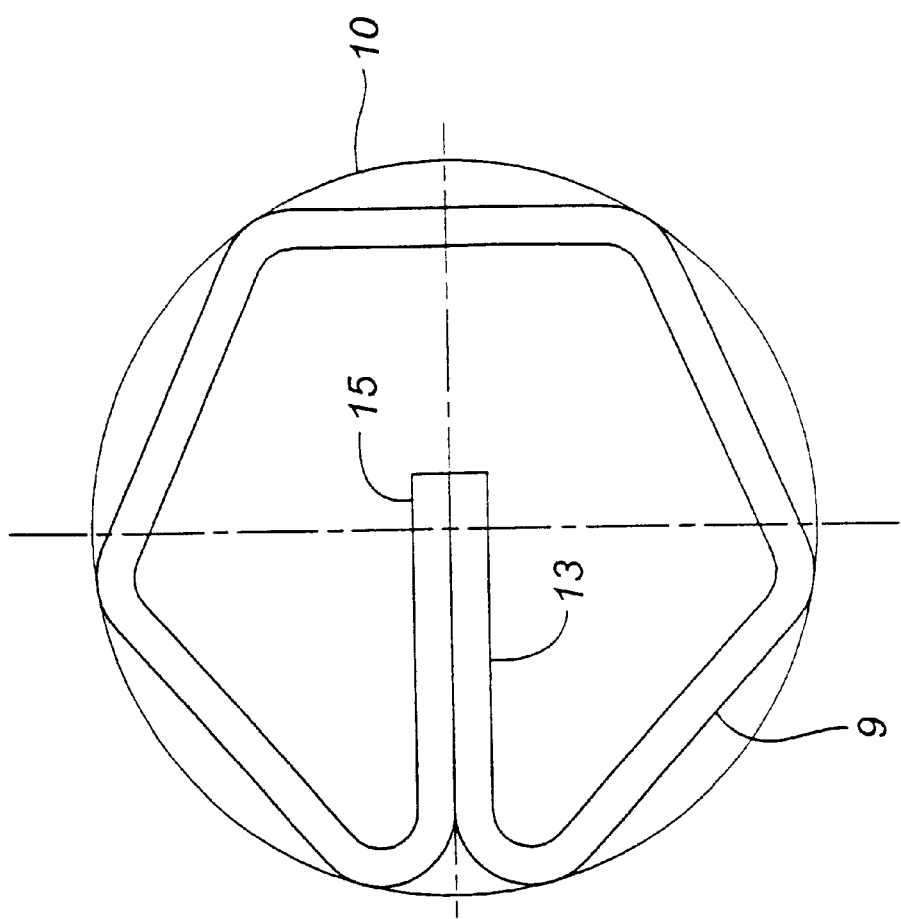
FIG. 3 is a top view showing the fixing turn of the resilient return means of FIG. 1, in a radially stressed condition, prior to the release in a receiving groove.

FIG. 1 and 3 show the preferred embodiment of the resilient return means according to the present invention, which comprise a spiral spring 1 having noncontiguous turns 3, with an axis 5, and its first end 7 being fitted with a seat 9, the radial extent d of which, in the unstressed state, is greater that the corresponding inner dimension of a passage 10 intended for accommodating the spring 1 in an elongate element, typically a tubular or substantially tubular element and preferably, a straight or substantially straight one. The second end of the spring, facing in the opposite direction to the first end 7, includes a bearing area 11.

In the illustrated example, the spring 1 is a spring subjected to a compressive stress though, of course, a spring subjected to a tensile stress, which may consist of contiguous turns 3, does not depart from the scope of the present invention.

In the illustrated nonlimitative example, the spring 1 comprises a resilient area of noncontiguous turns 3, the diameters of which gradually increase from the bearing area 11 to the seat 9. For instance, the bearing area 11 consists of three contiguous turns of the same diameter. In an advantageous manner, the seat 9 is located in a median plane perpendicular to the axis 5 of the spring 1. Advantageously the seat 9 exhibits a radial compliance allowing the seat 9 to be resiliently inserted and retained in a receiving cavity made, in a preferred manner, in the inner face of a wall which defines, at least in part, a passage 10 in an elongate element in which the spring 1 according to the invention is to be mounted.

The cavity advantageously is an annular groove situated in a plane perpendicular to the axis 5. In an advantageous manner too, the axis 5 coincides with the axis of the passage made in the elongate body. Various shapes of the seat 9 make it possible to anchor the spring 1 in the passage. Thus, it may be shaped into an arc of a circle, extending over an angle greater that 180°, e.g. substantially equal to 240°. In the illustrated advantageous example, the seat 9 looks like a portion of a regular polygon, for instance a heptagon. In the judicious example, as shown, the heptagon portion includes five sides and it is wound in the opposite direction to the spiral, consisting of the turns 3 and which it is connected to by a branch 13. The end of the seat 9, opposite the end connected to the branch 13, is provided with a radially-inner lug 15. In the stressed condition, as represented in FIG. 3, the branch 13 and the lug 15 are parallel. On the contrary, in the unstressed state, as shown in FIG. 1 and 2, the branch 13 and the lug 15 define an angle a substantially equal to 60°. A turn 3.1, which is immediately adjacent to the seat 9, rests on the latter at three points of contact 16, which arrangement provides the return element according to this invention with a quite effective seating.

Figure 4:
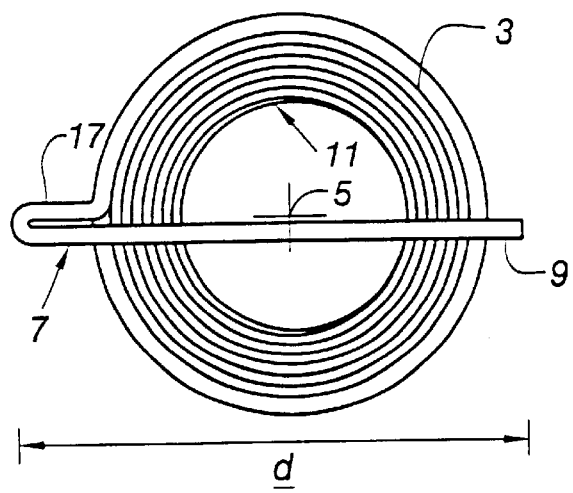
FIG. 4 is a top view of a second modified embodiment of the resilient return means according to this invention.

FIG. 4 shows an embodiment of a spring 1 in accordance with the present invention, which differs from the spring represented in FIGS. 1 through 3 as regards the shape of its seat 9, which substantially forms a straight line, advantageously crossing the axis 5. The length of the seat 9 is greater than the inner diameter of the accommodating passage 10 for the spring 1. The seat 9 is connected to the turns 3 by a hair-pin area 17. The springs 1, represented in FIGS. 1 through 4, advantageously consist of a wire, e.g. a steel wire and, preferably, a wire made of a spring steel. In the preferred embodiment, a 0.45 mm diameter steel wire has been used. In the unstressed state, the spring length amounts, e.g., to 11.25 mm. Under a load of 1.65 N, the spring has a length of 7.45 mm. Under a 2.21 N load, the spring has a length of 6.15 mm. And under the maximum load, that is when the turns 3 are situated edge to edge, the spring 1 has a length of 5.5 mm.

Nevertheless, the implementation of springs made of nonmetallic materials, and more particularly consisting of plastics or composites, does not depart from the scope of this invention.

Figure 5:
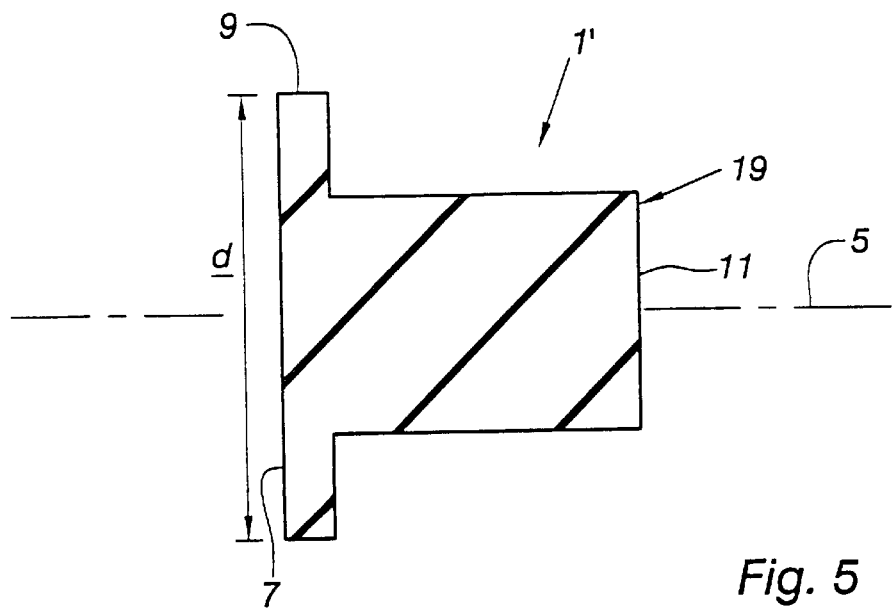
FIG. 5 is a longitudinal sectional view of a third modified embodiment of the resilient return means according to the present invention.

The present invention is in no way restricted to the implementation of springs as resilient return elements, quite the contrary, it encompasses the implementation of other resilient return means 1', such as solid or tubular pieces made of an elastomer, more particularly rubber. FIG. 5 shows an example of an elastomer resilient return element according to the present invention, comprising a body 19, e.g. cylindrical, conical or else, and bearing, at one end, a seat 9, for instance annular or with a right-angled or rounded cross-sectional area. The radial extent d of the seat 9 is greater than the corresponding inner dimension of a passage 10 intended for accommodating the resilient return means 1' in the elongate body. The seat 9 may be fitted with a reinforcement, such as a split ring made of a resilient material, more particularly steel.

Figure 6:
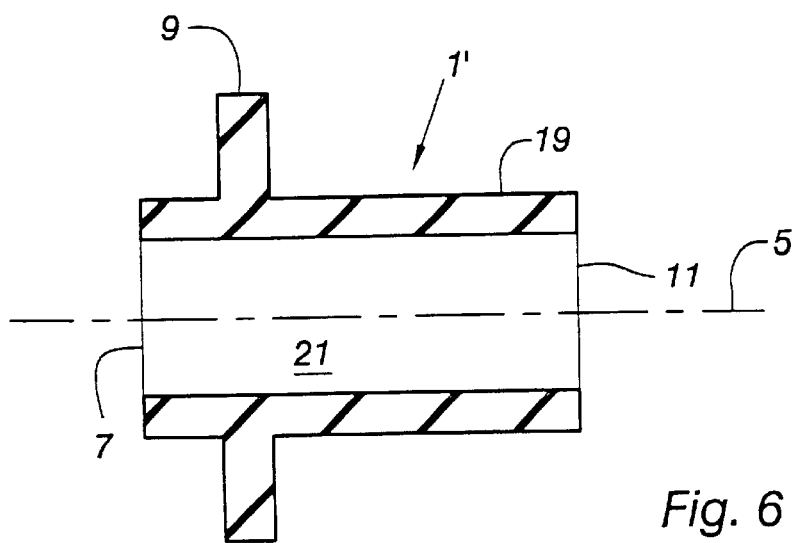
FIG. 6 is a longitudinal sectional view of a fourth modified embodiment of the resilient return means according to the invention.

As for the example shown in FIG. 6, the body 19 of the resilient return means 1' includes a central passage 21 for a fluid flow. Moreover, the seat 9 is no longer situated at one end of the body 19.

In an advantageous manner, the elongate body accommodating the resilient return means 1 or 1' has a tubular shape, such as a sleeve or similar. The resilient return means 1 or 1' according to this invention are remarkably well adapted for the return of a valve of a master cylinder in a hydraulic braking circuit of a motor vehicle.

Figure 7:
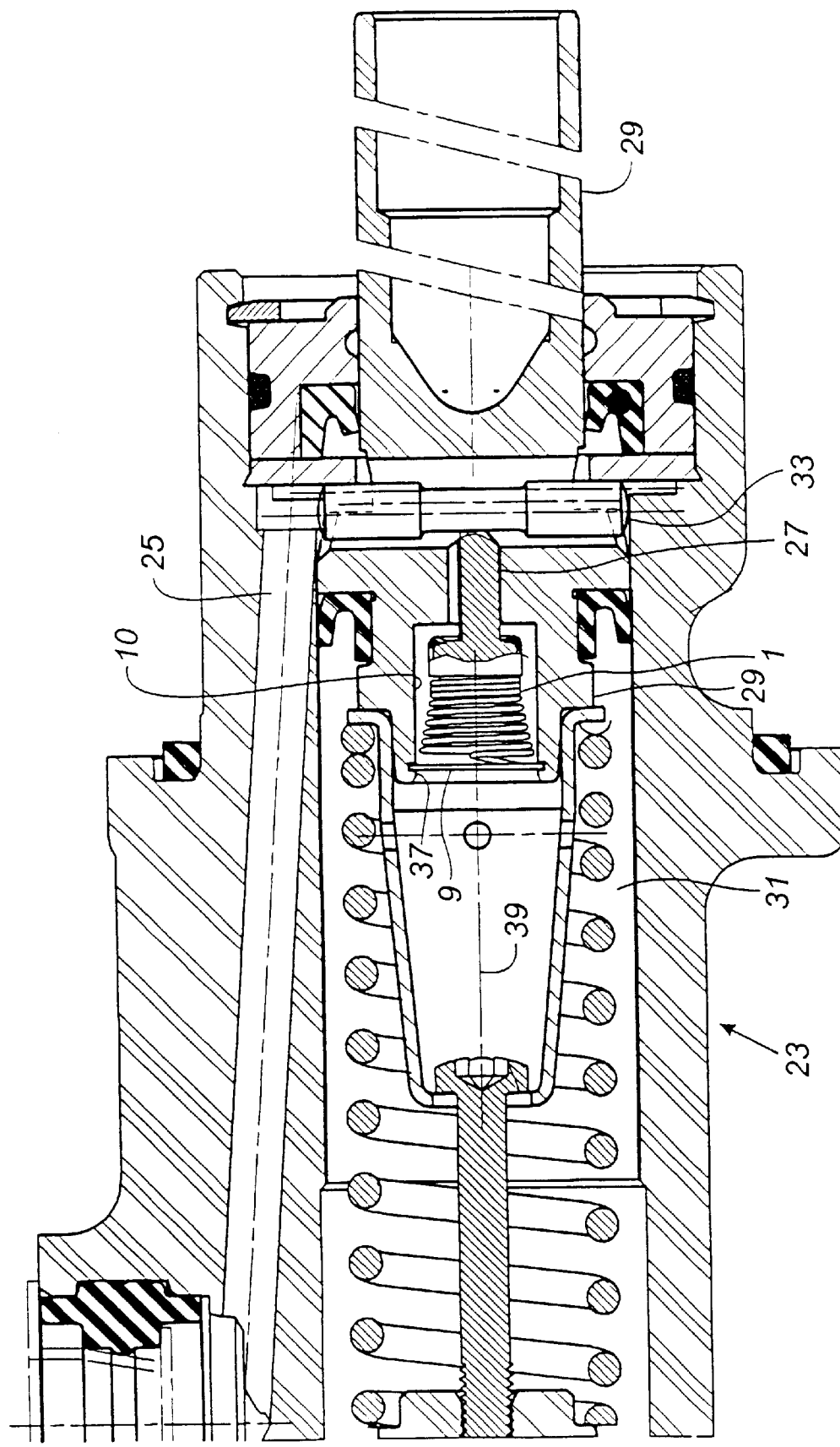
FIG. 7 is a longitudinal sectional view, showing a tandem master cylinder according to the present invention.

FIG. 7 shows a detail of a double master cylinder 23, called a tandem master cylinder, according to the present invention, and incorporating the preferred embodiment of a spring 1 in accordance with this invention (as represented in FIG. 1–3).

The master cylinder 23 comprises a resupply passage 25 intended to be connected with a nonpressurized brake fluid tank (not shown). A valve 27, axially extending in a primary piston 29, connects a primary chamber 31 with the resupply passage 25. The valve 27 comprises a stem, bearing on a pin 33 under the action of a spring 1 according to this invention, preferably as represented in FIG. 1 through 3, and arranged in a bore 10 in the primary piston 29. The seat 9 of the spring 1 engages with a U-profiled circular groove 37, made in the inner face of the bore 10 in a plane perpendicular to an axis 39 of the master cylinder 23.

It is to be understood that the installation of the spring 1 according to the present invention at the valve of the secondary piston (not represented) of the tandem master cylinder 23, or at the single piston of a single master cylinder does not depart from the scope of this invention.

The present invention concerns, more particularly, the mechanical and hydraulic engineering.

And the present invention mainly applies to the motor car industry and, more especially, to the design and manufacturing of braking devices.

What is claimed is:
1. A resilient return means comprising a spring having a first end and a second end, said first end having a single turn with a polygonal shape to define a seat that is connected by a leg to a plurality of noncontiguous turns that transition into a plurality of contiguous turns defining a bearing end adjacent said second end, said plurality of noncontiguous turns having diameters that gradually increase from a beginning first diameter corresponding to a diameter of said plurality of contiguous turns toward an ending larger diameter adjacent said leg, said single turn being radially compliant and elastically retained in a receiving cavity located within one wall of an elongated member, said single turn being wound in an opposite direction with respect to said plurality of noncontiguous turns such that on receipt of a force on said bearing end said plurality of noncontiguous turns move in an axial plane within said elongated member.

2. The resilient return means according to claim 1, characterized in that said spring is a spiral spring.

3. The resilient return means according to claim 1, characterized in that said spring works in compression.

4. The resilient return means according to claim 1 characterized in that said ending larger diameter of said plurality of noncontiguous turns bears on said seat at three points of contact.

5. The elongate body according to claim 1, characterized in that said elongate body is tubular.

6. The elongate body according to claim 1, characterized in that said elongate body is a tandem master cylinder and in that said the return spring assists in an axial return of a valve to a closed position.

7. The elongate body according to claim 1, characterized in that said elongate body is a tandem master cylinder and in that said plurality of noncontiguous turns assists in an axial return of a valve to a closed position.

8. A resilient return means comprising a spring having a first end and a second end, said first end having a single turn to define a seat that is connected by a leg to a plurality of noncontiguous spiral turns that transition into a plurality of contiguous spiral turns defining bearing end adjacent said second end, said plurality of noncontiguous spiral turns having diameters that gradually increase from a beginning first diameter corresponding to a diameter of said plurality of contiguous turns toward an ending larger diameter adjacent said leg, said single turn being radially compliant and elastically retained in a receiving cavity located within one wall of an elongated member, said single turn being wound in an opposite direction with respect to spirals formed by said plurality of noncontiguous turns such that on receipt of a force on said bearing end said plurality of noncontiguous turns move in an axial plane within said elongated member.

* * * * *